Patented Oct. 14, 1952

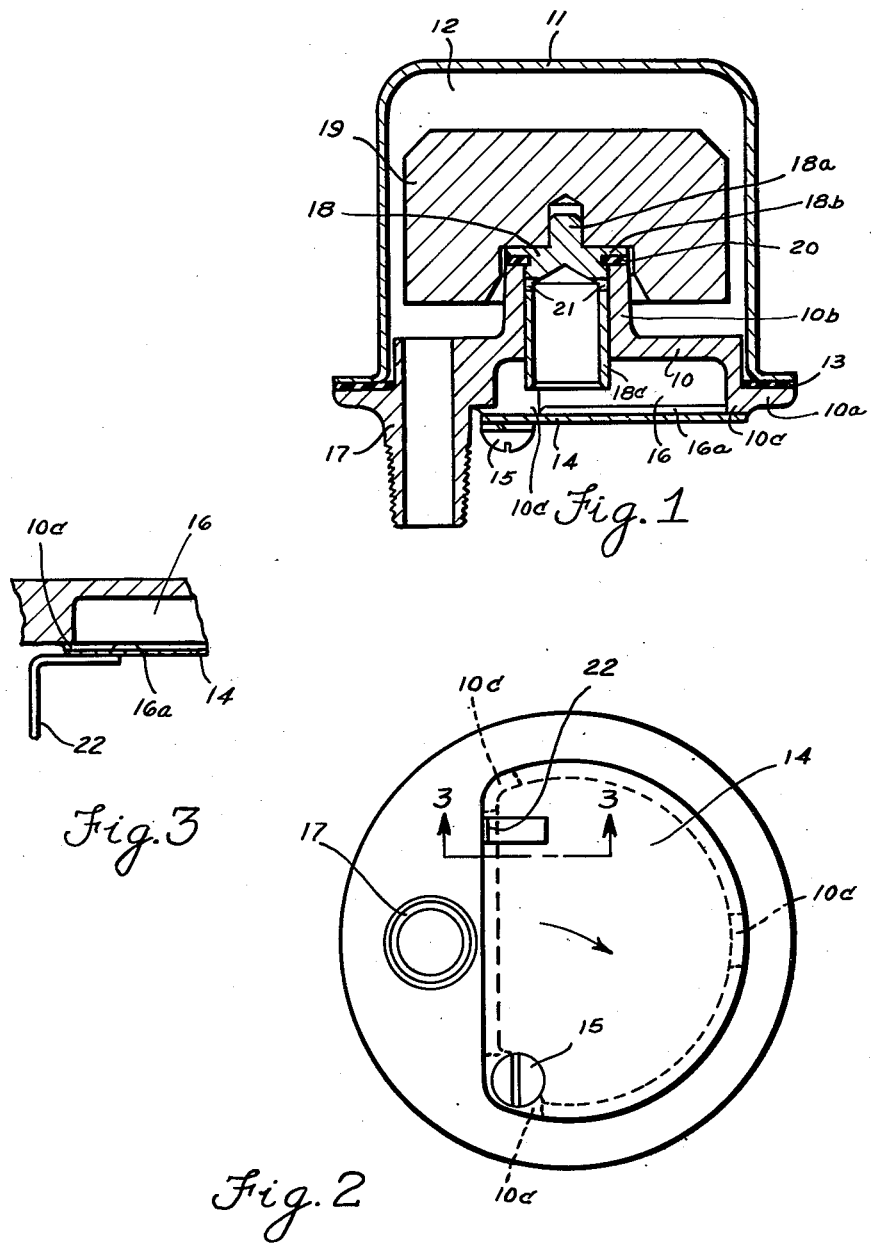

2,613,759

UNITED STATES PATENT OFFICE 2,613,759

VACUUM REGULATOR FOR MILKING SYSTEMS

Walter A. Scott, Poughkeepsie, N. Y., assignor to The De Laval Separator Company, New York, N. Y., a corporation of New Jersey Application December 6, 1949, Serial No. 131,453

5 Claims. (Cl. 183—41)

This invention relates to regulators for maintaining a uniform degree of vacuum in a pipe line of a vacuum milking machine installation.

Vacuum milking machine installations include at least one pipe line connected to a source of vacuum, such as a vacuum pump, which generally has a capacity far in excess of normal requirements. Therefore, in order to maintain the desired degree of vacuum in the pipe line (usually equivalent to 12–14 inches of mercury) it is common practice to provide the pipe line with a vacuum regulator which automatically vents the line to atmosphere whenever the vacuum becomes too high, and which automatically closes the vent when the desired vacuum again prevails.

Although many forms of vacuum regulators have been proposed and used, a well known example of which is found in Hall Patent No. 1,420,035, the prior regulators have not been entirely satisfactory. This is due largely to the fact that after a relatively short period of use they sometimes fail to respond quickly and consistently to significant changes in the degree of vacuum. Such a failure in the operation of the regulator causes the degree of vacuum in the pipe line to vary beyond predetermined limits established for good milking practice. It has been found that such faulty operation is caused by dust particles, inherent to barn air, collecting on the sliding surfaces of the regulator mechanism. In order to restore the regulator to normal operation, it must be dismantled and its various parts thoroughly cleaned before reassembly.

The principal object of the present invention, therefore, is to provide a vacuum regulator which is self-cleaning with respect to its contained ports and passages which might become clogged with deposits of dirt particles from the air.

A further object is to provide a vacuum regulator of simple and inexpensive construction, which is rugged and reliable in operation.

A vacuum regulator made according to the invention comprises a housing adapted to be connected to the vacuum pipe line of the milker installation. The housing has an elongated air inlet passage leading to the interior of the housing and an air outlet passage which, when the housing is so connected, communicates with the interior of the vacuum pipe line. The inlet passage is controlled by a valve member normally seated on a part of the housing surrounding the inlet passage, the valve member having a depending hollow tube which is open at the bottom but is closed at the top except for a lateral port or ports. The tube has a close sliding fit in the air inlet passage and, when the valve member is seated, projects somewhat below the lower end of this passage and into atmospheric air. In this position of the valve member, the lateral ports are below the upper end of the inlet passage and are therefore closed by the side walls of the latter. When the vacuum becomes too high, the sub-atmospheric pressure within the housing is insufficient to hold the valve member, and a selected weight thereon, down against the upward force of atmospheric pressure acting upon the valve member, whereupon the latter moves upwardly to displace the lateral ports above the inlet passage. Air then flows through the depending tube, the lateral ports, the interior of the housing and its outlet passage to the pipe line, until the desired degree of vacuum is restored, whereupon the valve member drops to its initial position so as to close the tube ports.

With this construction, the depending tube prevents dust-laden air from reaching the inlet passage walls on which the tube slides in the movement of the valve member. Since the lateral ports which are alternately opened and closed are in the depending tube of the valve member, the up-and-down movements of the tube, which often occur quite rapidly with a fluttering action, oppose any tendency for dust to remain in these ports.

For a better understanding of the invention, reference may be had to the accompanying drawings, in which Fig. 1 is a vertical sectional view of a preferred form of vacuum regulator according to the invention;

Fig. 2 is a bottom view of the regulator showing details of the removable bottom cover, and Fig. 3 is a vertical sectional view on a somewhat enlarged scale taken on line 3—3 of Fig. 2, showing a portion of the air inlet slit and the finger grip by means of which the bottom cover is swung to its open position for the purposes of cleaning.

The vacuum regulator as illustrated comprises a housing made up of a valve body 10 and a dome 11 supported on the body and forming therewith a chamber 12. A gasket 13 forms an air-tight seal between the lower portion of the dome and a flange 10a of the body on which the dome rests. A cover 14 is secured to the under side of the body by pivotal means in the form of a screw 15 and can be swung laterally on the screw to permit inspection of the interior of the regulator and removal of any dust particles which might accumulate within an air inlet chamber 16 of the regulator.

The body 10 is provided with a nipple 17 adapted to connect the housing chamber 12 to the milking machine pipe line (not shown) in which the desired degree of vacuum is to be maintained. The body 10 is provided also with a cylindrical upstanding boss 10b constituting means forming an air inlet passage connecting the air inlet chamber 16 with the housing chamber 12.

A valve member 18 is reciprocable vertically in the housing to open and close the chamber 12 to atmospheric air. The valve member is provided with a locating pin 18a on its upper end which fits loosely into a socket in a weight 19 mounted on the valve member. Below the pin 18a, the valve member has a shoulder 18b overlying a gasket 20 which forms a shoulder part of the valve member and normally seats on top of the boss 10b to provide an air-tight seal against leakage of air into the chamber 12. Below the gasket 20, the valve member is provided with a depending hollow tube 18c which has a close sliding fit in the inlet passage formed by the boss 10b. The tube 18c is open at its lower end where, in the lowermost position of the valve member, it projects beyond the inlet passage and into the inlet chamber 16. At its upper end, the tube 18c is closed except for lateral ports 21. The vertical spacing between the ports 21 and the gasket 20 is less than the distance through which the lower end of tube 18c projects into chamber 16 when the valve member is seated. Accordingly, when the latter is raised to move the ports 21 above the boss 10b, thereby connecting chamber 16 through tube 18c and the ports to the chamber 12, the tube continues to cover the inner surface of the hollow boss 10b at its lower end, that is, the lower wall of the air inlet passage.

The movable cover 14 is spaced a short distance from the lower edge of chamber 16 by a plurality of lugs 10c, thereby providing restricted inlet passages 16a of relatively thin cross section for the entrance of air to chamber 16. However, for the purpose of cleaning chamber 16, the same may be completely exposed by turning the cover 14 about pivot screw 15 in the direction indicated by the arrow in Fig. 2. A finger grip 22 (Fig. 3) is provided to facilitate this operation. It will be observed that the nipple 17 acts as a stop to limit the pivotal movement of cover 14 when it is swung on the screw to close the chamber 16.

In the use of the regulator, the nipple 17 not only connects chamber 12 to the pipe line (not shown) of the milker installation but also serves as a mounting or support means for the entire regulator valve structure. With nipple 17 connected to the milker vacuum pipe line, air is exhausted from chamber 12 through the nipple. When the pressure within the chamber 12 is reduced to a degree predetermined by the weight 19, atmospheric pressure in chamber 16 acts upon the upper or closed end of tube 18c (and the annular surface at its lower end) to raise the valve member 18 and its weight 19, until the ports 21 are above the upper edge of the boss 10b. The ports 21 are thus uncovered and allow air at atmospheric pressure to flow from chamber 16 to chamber 12, which is under partial vacuum, and thence through nipple 17 into the vacuum pipe line, until the sub-atmospheric pressure in chamber 12 becomes great enough to cause the valve member and its weight to move downward against the opposing atmospheric pressure. The ports 21 will then return into the boss 10b, thereby cutting off the flow of air into chamber 12.

The chamber 16 is relatively large as compared to the inlet passages 16a leading thereto. Therefore, air entering chamber 16 passes through the relatively small inlet slits 16a at a high velocity, and once it reaches the relatively large space of chamber 16, its velocity becomes very low. In this way, dust particles carried by the air are prevented from being deposited in the slit areas 16a but are permitted to settle out and deposit on the upper side of the cover plate 14, which can be easily cleaned. Accordingly, it is not necessary to cover the air inlet opening or openings of the regulator with a screen. The elimination of such screens, or the like, is desirable, because they eventually become clogged with dust particles filtered from the air and thus result in failure of the regulator to function uniformly and consistently.

It will be observed that the atmospheric air in passing from inlet chamber 16 to the reduced pressure chamber 12 moves through the interior of the valve tube 18c and, due to the specific length of the tube as heretofore described, does not pass over any portion of the relatively sliding surfaces between the tube and the stationary boss 10b. In this way, collection of dust particles on the sliding surfaces is avoided and any possible failure of the regulator due to such a collection is prevented.

It will also be observed that if any dust particles should collect in the ports 21 or on the vertical surfaces of the air passage in tube 18c, they will be shaken free by the sudden stop to the downward movement of the valve member due to the gasket 20 thereof striking its seat at the upper edge of boss 10b, and the dust particles will fall upon the cover plate 14. By reason of the sensitivity of the valve assembly to small changes in the sub-atmospheric pressure in chamber 12, the valve assembly will at times move up and down quite rapidly, with more or less of a fluttering action, and since the ports 21 and the tube 18c partake of these movements, they tend to free themselves of any accumulation of dust deposits.

I claim:

1. In a vacuum regulator for the vacuum pipe line of a milker system, and which comprises a housing having a chamber provided with an air outlet adapted to be connected to the interior of the pipe line, the combination of a hollow boss extending upward into said chamber and forming an elongated air inlet passage leading upward from atmosphere to said chamber, a valve member reciprocable vertically in the chamber and having a shoulder normally seated on said boss to close the chamber from atmosphere, and a depending hollow tube on the valve member extending downward through said passage and having a close sliding fit therein, the tube being closed at its upper end except for a lateral port which, when said shoulder is seated, is located below the upper end of the inlet passage and closed by the passage wall, the lower end of the tube being in open communication with atmosphere and, when said shoulder is seated on said boss, projecting downward from the lower end of the passage for a distance at least as great as the distance between said port and the upper end of the passage, whereby the tube covers the lower part of the passage wall when the valve member is raised to elevate the port above the inlet passage, the atmospheric pressure acting upon said closed upper end of the tube and upon the lower end thereof being operable to raise the valve member and elevate said port above the inlet passage, thereby admitting air through the tube and port to said chamber.

2. The combination according to claim 1, comprising also a cover plate on the housing below the tube and forming with the housing an air inlet chamber into which the tube extends.

3. The combination according to claim 1, comprising also a cover plate on the housing below the tube and forming with the housing an air inlet chamber into which the tube extends, the cover plate also defining a slit for admitting air into said last chamber.

4. The combination according to claim 1, comprising also a cover plate on the housing below the tube and forming with the housing an air inlet chamber into which the tube extends and pivotal means for securing the cover plate to the housing and on which the plate is movable to expose said last chamber.

5. The combination according to claim 1, comprising also a cover plate on the housing below the tube and forming with the housing an air inlet chamber into which the tube extends, pivotal means for securing the cover plate to the housing and on which the plate is movable to expose said last chamber, and a nipple on the housing defining said air outlet and forming a stop for limiting movement of the cover plate on said pivotal means.

WALTER A. SCOTT.

REFERENCES CITED

The following references are of record in the file of this patent:

UNITED STATES PATENTS

| Number | Name | Date |
|--------|------|------|
| 156,165 | Jonson | Oct. 20, 1874 |
| 1,420,035 | Hall | June 20, 1922 |
| 1,488,604 | Lawton | Apr. 1, 1924 |
| 2,217,056 | Johnson | Oct. 8, 1940 |